United States Patent [19]

Saretzky

[11] 4,393,958

[45] Jul. 19, 1983

[54] PROGRESSIVE-CENTRAL LUBRICATION SYSTEM

[75] Inventor: Horst Saretzky, Ennepetal, Fed. Rep. of Germany

[73] Assignee: De Limon Fluhme GmbH & Co., Düsseldorf, Fed. Rep. of Germany

[21] Appl. No.: 235,288

[22] Filed: Feb. 17, 1981

[30] Foreign Application Priority Data

Mar. 6, 1980 [DE] Fed. Rep. of Germany ....... 3008543

[51] Int. Cl.³ .......................... F16N 7/38; F16N 29/00
[52] U.S. Cl. .................................... 184/7 D; 184/7 E
[58] Field of Search .................... 184/7 D, 7 E, 7 F; 222/250; 137/625, 625.11

[56] References Cited

U.S. PATENT DOCUMENTS

| | | | |
|---|---|---|---|
| 2,986,234 | 5/1961 | Akamatsu et al. | 184/7 E |
| 2,996,147 | 8/1961 | Callahan | 184/7 D |
| 3,038,557 | 6/1962 | Callahan | 184/7 D |
| 3,406,790 | 10/1968 | Gruber | 184/7 E |
| 3,515,245 | 6/1970 | Obergefell et al. | 184/7 E |
| 3,707,203 | 12/1972 | Roberts | 184/7 D X |

FOREIGN PATENT DOCUMENTS

| | | | |
|---|---|---|---|
| 2023774 | 10/1972 | Fed. Rep. of Germany . | |
| 309293 | 8/1955 | Switzerland | 184/7 D |
| 784323 | 10/1957 | United Kingdom | 184/7 F |
| 662777 | 5/1976 | U.S.S.R. | 184/7 D |

Primary Examiner—David H. Brown
Attorney, Agent, or Firm—Martin A. Farber

[57] ABSTRACT

Of the progressive distributors a first so-called master distributor (9) is connected at one of its outlets by a control line to one of the control chambers of the second progressive distributor, this control chamber not having any direct connection with the feed line. In order that the system may be suitable both for intermittent and for continuous use with preselectable cycles corresponding to the control quantity and in order to avoid undesired multiple cyclings of individual progressive distributors with the result of over-lubrication, further progressive distributors (3, 4, 5, 6, 7, 8) are connected, each by a separate control line (10, 11, 12, 13, 14, 15), to other outlets of the master distributor (9). The corresponding control chamber of the further progressive distributors (3, 4, 5, 6, 7, 8) which are connected in this manner has no direct connection to the feed line (2).

11 Claims, 1 Drawing Figure

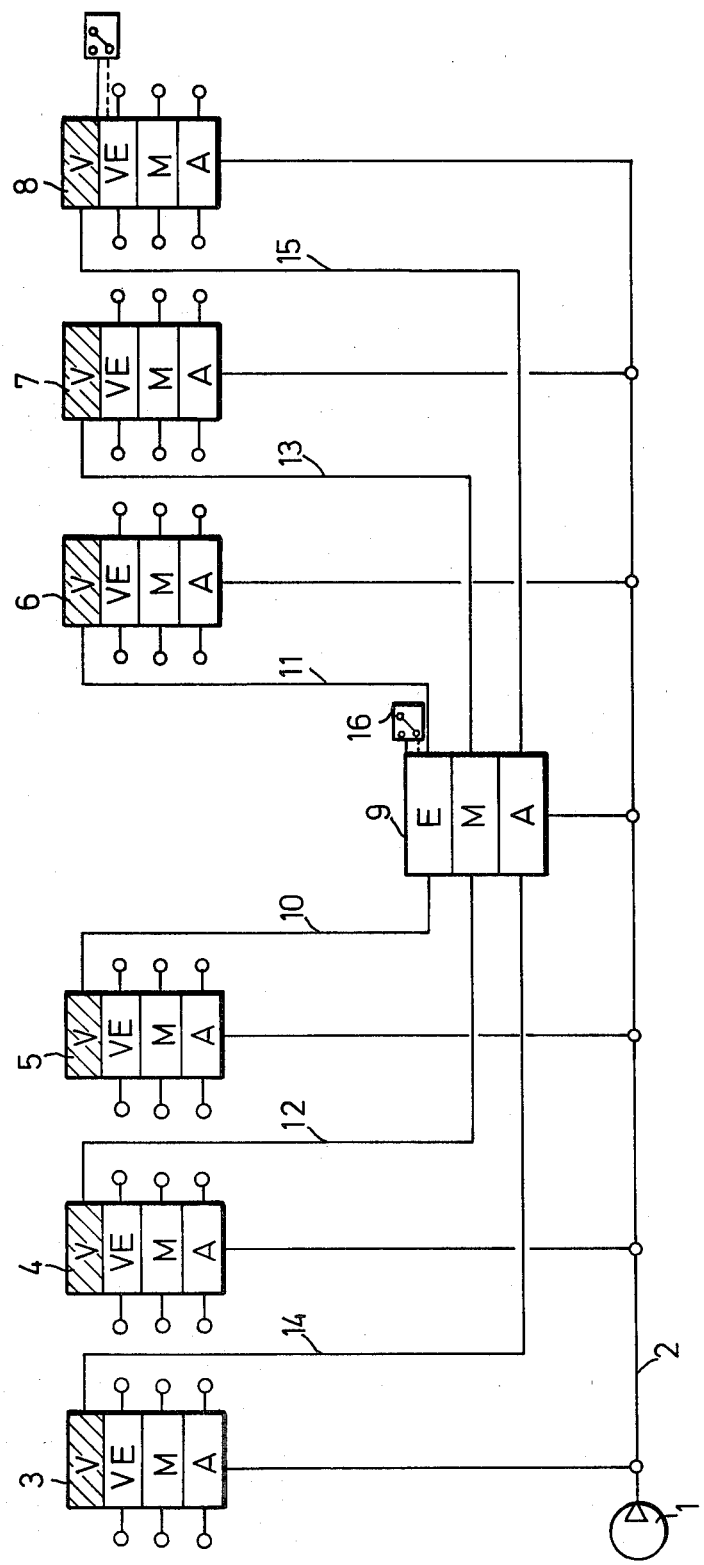

PROGRESSIVE-CENTRAL LUBRICATION SYSTEM

The present invention relates to a progressive central lubricating system having at least two progressive distributors connected to a feed line, of which distributors a first so-called master distributor is connected at one of its outlets by a control line to one of the control chambers of the second progressive distributor, said control chamber not having any direct connection to the feed line.

From West German Pat. No. 20 23 774 there is known a progressive central lubricating system of this type in which, in contradistinction to traditional progressive central lubricating systems in which a plurality of secondary distributors are connected in series with a main distributor, the progressive distributors are connected in parallel to a supply line, controlling each other in the manner that all distributors have either the same number of strokes or a given ratio of the number of strokes. Progressive systems which are controlled in parallel are particularly well suited for continuous lubrication since with this manner of operation, in all cases, several distributors carry out identical or different circulation cycles corresponding to the control quantity.

With the connection in parallel of progressive distributors with mutual control two different types of progressive distributors are used. The so-called master distributor consists generally of a plurality of individual segments which are screwed together and sealed off from each other, namely an initial segment, a middle segment and an end segment. Each distributor segment has a pistion which is alternately forced into the two end positions by the lubricant. By means of annular grooves the pistons are so controlled in a given sequence that the next piston can only be displaced when the piston movement of the preceding piston is practically completed. All piston bores are connected directly by a central bore with the inlet, which in its turn is connected to the feed line.

The progressive distributor controlled by this master distributor as well as other distributors which control each other have a slightly modified end segment as compared with the master distributor, by which the central bore is sealed off from the adjacent middle segment and instead of this an external connection of the central bore is provided to which the control line is connected. The types of distributors as such are known.

Such progressive central lubricating systems have the disadvantage in connection with lubricating points which are to be lubricated intermittently that, for instance, depending on the amount of pressure and of lubricant, the first distributor may have already operated for ten cycles before the tenth remote-controlled distributor has completed merely one cycle. This results in over-lubrication when the limit switch of the tenth distributor disconnects the system via the switch circuit of the central lubricating system. Parallel controlled progressive central lubricating systems are not suitable for intermittent lubricating cycles since upon disconnection by the last remote-controlled distributor the preceding distributors have made undesired multiple cycles and excess lubrication can have occurred due to phase shifts in the quantities of lubricant delivered.

The object of the present invention is to develop a progressive central lubricating system of the aforementioned type which is suitable both for intermittent and for continuous use with preselectable cycles in accordance with the control quantity, and in which, by the avoidance of undesired multiple cyclings of individual progressive distributors over-lubrication is prevented.

This object is achieved in accordance with the invention in the manner that further progressive distributors are connected each by a separate control line to other outlets of the master distributor and that the corresponding control chamber of the further progressive distributor which is thus connected has, in known per se manner, no direct connection with the feed line. The essence of the invention is based on the fact that a plurality of progressive distributors with control segments which are connected to a feed line are controlled not by the end segment but by a master distributor, outlets of which in corresponding number are connected directly via separate control lines with control chambers of these remote-controlled progressive distributors. In this way both continuous and intermittent use of the system is made possible, over-lubrication being avoided since the circulation cycle of the subsequent progressive distributors can be determined precisely as a function of the control quantity from the master distributor, in which connection also partial cycles or multiple cycles can be determined without the circulation cycles of the other distributors being affected.

The adaptations to the lubricant requirements of rubbing or friction points can be improved if the pistons and working chambers of individual segments of the master distributor are developed for dispensing different control quantities. Furthermore, in one suitable development of the invention it is proposed to connect to the end segment of the master distributor or of the last remote-controlled distributor in this cycle, a limit switch which is integrated in a monitoring circuit of the system.

Further details, features and advantages of the object of the invention will become evident from the following description of the accompanying drawing, the sole FIGURE of which diagrammatically shows a progressive central lubricating system.

To a pump 1 there is connected a feed line 2 by which the amount of lubricant conveyed by the pump 1 is fed to progressive distributors 3-9. All progressive distributors have an initial segment A, the inner construction of which is known and therefore will not be described in detail here. The connection of the progressive distributors to the feed line 2 is effected in parallel. A total of six remote-controlled progressive distributors 3, 4, 5 and 6, 7, 8 respectively of one kind and a master distributor 9 of another kind are used. All distributors are provided with normal middle segments M. Finally, the master distributor 9 has a normal end segment E while the six remote-controlled progressive distributors 3, 4, 5 and 6, 7, 8 respectively each have a modified end segment VE and a control line segment V.

The essence of the system described resides in the fact that the control line segments V of the progressive distributors 5 and 6 are connected to the two outlets of the end segment E of the master distributor 9 via separate control lines 10, 11, that the two control line segments V of the progressive distributors 4 and 5 are connected to the two outlets of the middle segment M of the master distributor 9 via separate control lines 12, 13, and that finally the control segments V of the progressive distributors 3 and 8 are connected to the two outlets of the initial segment A of the master distributor 9 via separate control lines 14, 15. In this way the result is obtained that all remote-controlled progressive distributors 3, 4, 5 and 6, 7, 8 respectively of the system are controlled by the master distributor 9 since admission through the feed line connection in the initial segment is insufficient to cause a distributor cycle to take place in view of the lack of connection between the control chamber of each end segment VE with the adjacent middle segment. For this purpose, rather, the additional admission to the segment VE via the corresponding control line and the corresponding outlet of the master distributor 9 is necessary.

It is pointed out that the number of central segments of all distributors is variable and up to ten segments can be combined into a distributor block, depending on the lubricant.

In the system shown in the drawing, corresponding control quantities given off by the master distributor can produce different circulation cycles at distributors 5/6 (for instance five cycles), 4/7 (for instance one cycle) and 3/8 (for instance one-half cycle, respectively). Furthermore the quantities delivered by the individual segments of the distributors 3 to 8 can be established differently in known manner by varying the piston diameters.

Upon placing the pump 1 in operation the pistons of the middle segments M and VE of all remote-controlled progressive distributors 3, 4, 5 and 6, 7, 8 respectively are brought on one side, left or right depending on the position of the piston of the initial segment A, into an end position. Further travel or displacement of the piston to the other side can only take place when the piston in the initial segment A is displaced by a control quantity from the master distributor via the segment V and in this way supplying of the feed line 2 is made possible.

The master distributor 9 is so designed with respect to the volumetric quantities given off at its outlets that the progressive distributors 3, 4, 5 and 6, 7, 8 controlled by it can carry out partial, one entire or several cycles. In addition to this, it can also be provided that a remote-controlled progressive distributor, for instance a distributor 3 or 4 of the system, supplies one-half of its connected rubbing points with lubricant as a function of the control quantity of the master distributor 9 only after several, for instance four to eight, cycles. In this way the supplying of lubricating points having different lubricant requirements is assured even in intermittent operation without danger of over-lubrication. In this connection the operation of the remote-controlled progressive distributors takes place entirely independently of each other.

A limit switch 16 integrated in a monitoring unit of the system can be connected to the end segment E of the master distributor 9 or of the last remote-controlled distributor in this cycle.

I claim:

1. In a progressive central lubricating system having at least two progressive distributors connected to a feed line, of which distributors a first so-called master distributor has a plurality of outlets and a second of the progressive distributors has a control chamber, a control line for connecting one of the outlets of the master distributor to the control chamber of the second of the progressive distributors, said control chamber having no direct connection to the feed line, the improvement comprising a predetermined additional amount control lines respectively corresponding to the other outlets of the master distributor, a predetermined amount of other progressive distributors respectively corresponding to the other outlets of the master distributor and having respective corresponding control chambers, the respective corresponding control chambers thereof are each connected by a separate of said additional control lines respectively to the other outlets of the master distributor, and said corresponding control chambers of said other progressive distributors having no direct connection to the feed line.

2. The central lubricating system according to claim 1, wherein
said master distributor has an end segment, said system further comprising
a monitoring circuit having a limit switch integrated therein,
said limit switch is connected with said end segment of said master distributor.

3. The central lubricating system according to claim 1, wherein each of the progressive distributors other than the master distributor has an end segment, said system further comprising
a monitoring circuit having a limit switch integrated therein,
said limit switch is connected with an end segment of at least one of the progressive distributors in the cycle other than the master distributor.

4. The central lubricating system according to claim 1, wherein
the progressive distributors other than the master distributor are remote-controlled progressive distributors unconnected with each other.

5. The central lubricating system according to claim 1, wherein
the progressive distributors other than the master distributor each comprise an initial segment, a middle segment and a control line segment joined together, and the master distributor comprises an initial segment, a middle segment and a normal end segment joined together.

6. The central lubricating system according to claim 1, wherein
said master distributor has individual segments, each said individual segment dispensing respectively predetermined control quantities, said individual segments communicate with said additional outlets.

7. The central lubricating system according to claim 6, wherein
said master distributor has an end segment, said system further comprising
a monitoring circuit having a limit switch integrated therein,
said limit switch is connected with said end segment of said master distributor.

8. The central lubricating system according to claim 6, wherein each of the progressive distributors other than the master distributor has an end segment, said system further comprising
a monitoring circuit having a limit switch integrated therein,
said limit switch is connected with an end segment of at least one of the progressive distributors in the cycle other than the master distributor.

9. The central lubricating system according to claim 5, wherein
there are six of said progressive distributors other than said master distributor and the initial segment of said master distributor has a first two of said control lines connected to respective control line segments of a first pair of said six progressive distributors, said master distributor having a second two of said control lines connected to respective control line segments of a second pair of said six progressive distributors, and said master distributor having a third two of said control lines connected to respective control line segments of a third pair of said six progressive distributors.

10. The central lubricating system according to claim 9, wherein
said feed line connects the six progressive distributors in parallel.

11. The central lubricating system according to claim 9, wherein
the feed line connects said master distributor in parallel with the six progressive distributors.

* * * * *